United States Patent [19]
Kellogg

[11] Patent Number: 5,752,578
[45] Date of Patent: May 19, 1998

[54] CONTROL APPARATUS

[75] Inventor: Roger L. Kellogg, Newark, Ill.

[73] Assignee: Caterpillar Inc., Peoria, Ill.

[21] Appl. No.: 644,675

[22] Filed: May 7, 1996

[51] Int. Cl.⁶ .................................................. B62D 5/06
[52] U.S. Cl. ........................ 180/414; 280/91.1; 74/471 XY
[58] Field of Search ............................... 180/408, 414, 180/412, 411, 333; 280/91.1; 74/469, 471 XY

[56] References Cited

U.S. PATENT DOCUMENTS

| | | | |
|---|---|---|---|
| 3,724,585 | 4/1973 | Conrad | 180/414 |
| 4,175,638 | 11/1979 | Christensen | 180/140 |
| 4,398,616 | 8/1983 | Braden et al. | 180/414 |
| 4,598,782 | 7/1986 | Ilon | 180/414 |
| 4,962,448 | 10/1990 | DeMaio et al. | 74/471 XY |

Primary Examiner—Paul N. Dickson
Attorney, Agent, or Firm—Paul J. Maginot; William C. Perry

[57] ABSTRACT

A steering control apparatus is disclosed for a first and second pair of wheel assemblies that are mounted for rotation with respect to a first and second axle. Selective rotation of the respective wheel assemblies is controlled by a plurality of actuators defined by a control module. The actuators are engaged by a control lever that is mounted for movement with respect to the control module in a preselected plane. The control module is rotatable with respect to the preselected plane to allow selective contact between the actuators and the control lever to control the rotation of the wheel assemblies with respect to the axles in one of a plurality of steering modes.

28 Claims, 13 Drawing Sheets

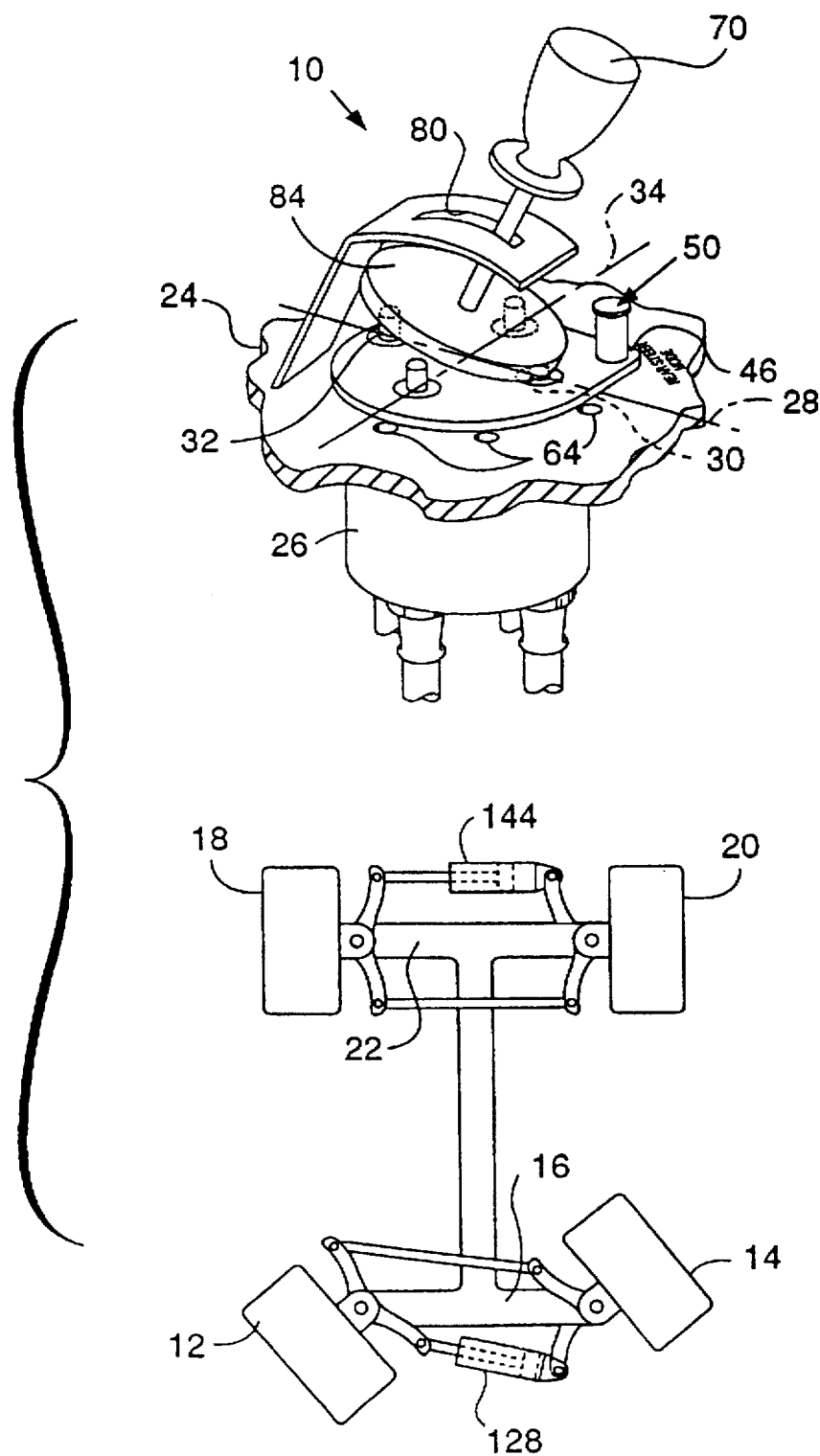

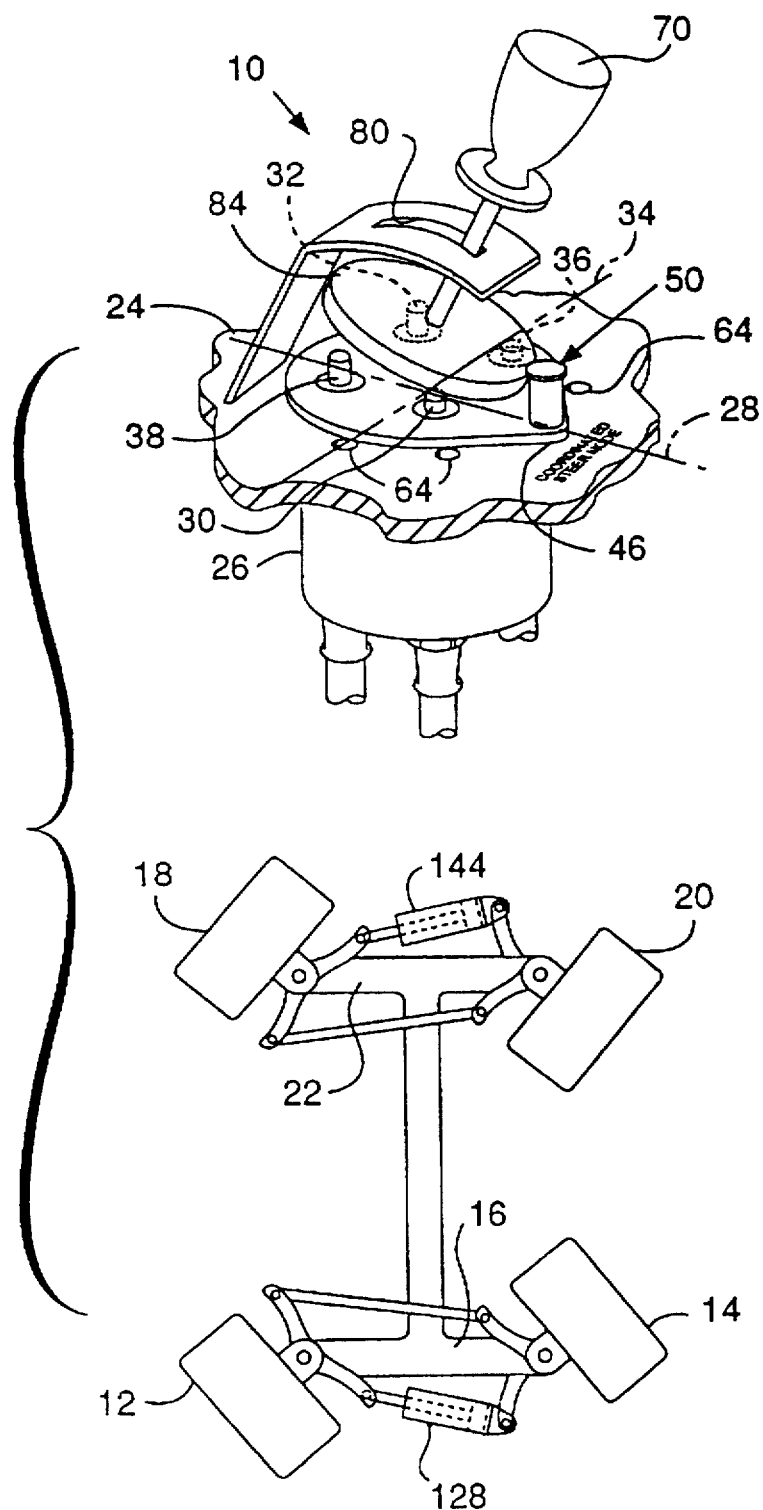
Fig_5_

Fig_6_
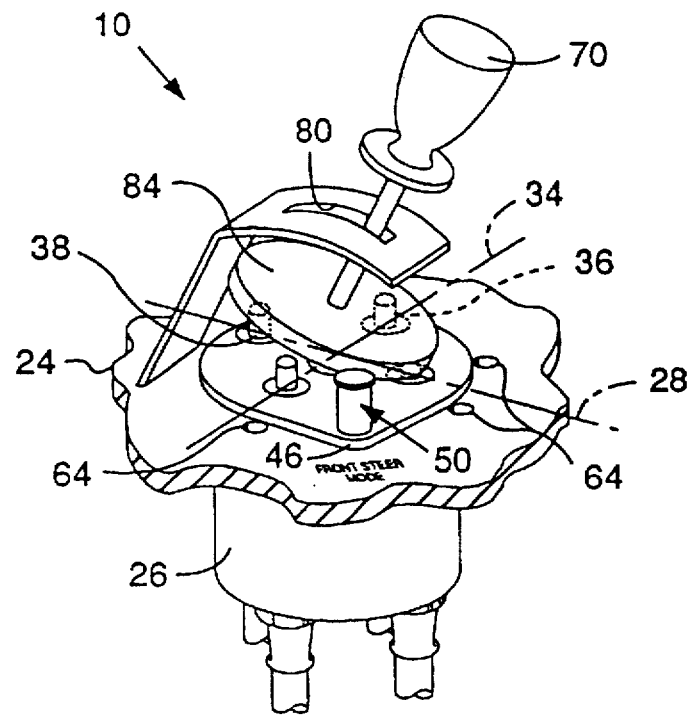
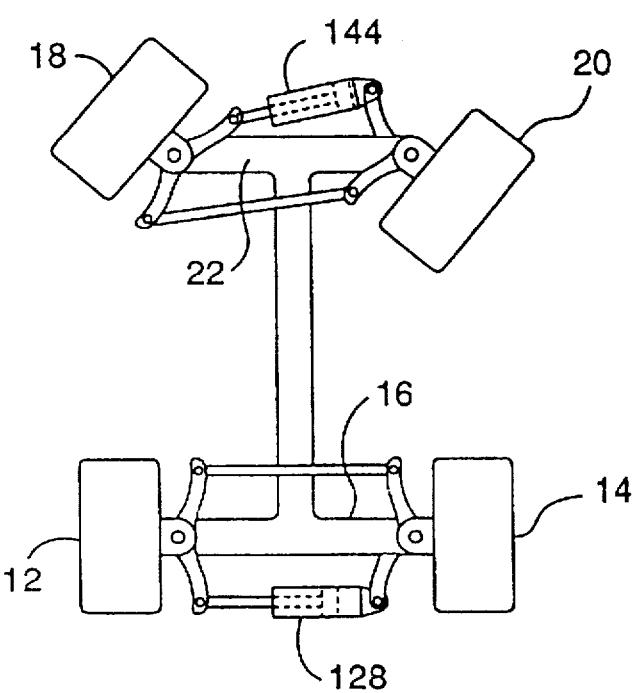

Fig_11

5,752,578

CONTROL APPARATUS

TECHNICAL FIELD

This invention relates generally to an apparatus for controlling a function of a machine and more particularly to an apparatus that controls the steering functions of a machine in one of a plurality of steering modes.

BACKGROUND ART

In modern day construction machines, there has been a great deal of effort directed toward ergonomic designs that reduce operator fatigue. Among these efforts have been the reduction in effort required to manipulate the various machine functions and implements. One of these innovations in particular has provided a steering method for a machine that is controlled by a lever. Replacement of the steering wheel that required multiple revolutions to operate a hand driven pump, with a lever that operates electronic or electro-hydraulic actuators has proven to substantially reduce the effort required to operate a machine.

DISCLOSURE OF THE INVENTION

In one aspect of the present invention, a control apparatus is provided for steering a machine having first and second axles and a pair of steerable wheel assemblies rotatably mounted on each of the respective axles. A housing is provided that rotatably mounts a control module. The control module has a plurality of actuators mounted therein for selectively controlling the rotation of the wheel assemblies on the respective axles. The control module is rotatable with respect to the housing to selected one of a plurality of steering modes under which the machine may be controlled. A control lever is pivotally mounted to the control module and is moveable in a first and second direction to actuate selected ones of the actuators in one of the plurality of steering modes.

In another aspect of the present invention, a control apparatus is provided for steering a machine having first and second axles and a pair of steerable wheel assemblies mounted on each of the respective axles. A housing is provided and a control module is rotatably mounted in the housing. A first pair of actuators is mounted in the control module along a first axis that is positioned in a first plane. Each of the actuators being adapted to selectively control the movement of the wheel assemblies mounted on the first axle in one of a first and second directions. A second pair of actuators is mounted in the control module along a second axis that is positioned in the first plane at an orientation that is perpendicular to the first axis. Each of the actuators is adapted to selectively control the movement of the wheel assemblies mounted on the second axle in one of a first and second direction. A control lever is pivotally mounted to the control module and is moveable in a second plane that is perpendicular to the first plane. An actuator plate is secured to the control lever for movement therewith and is adapted to selectively engage one or more of the first and second pairs of actuators. A means for rotating the control module with respect to the actuator plate is also provided and permits selective engagement between the actuator plate and the actuators.

In yet another aspect of the present invention, a control apparatus is provided for steering a machine having a first and second axles and a pair of steerable wheel assemblies mounted on each of the respective axles. A housing is provided that rotatably mounts a control module. A first actuator is mounted in the control module for reciprocating movement within the control module and is adapted to selectively control the movement of the first wheels in one of a first and second direction. A second actuator is mounted in the control module for reciprocating movement within the control module that is parallel to that of the first actuator and is adapted to selectively control the movement of the second wheels in one of a first and second direction. A control lever is pivotally mounted to the control module and is moveable in a preselected plane with respect to the control lever. An a means is provided for totaling the control module with respect to the preselected plane of movement of the control lever to provide selective reciprocation one or both of the first and second actuators.

With a control apparatus as set forth above, a machine may be selectively operated in one of a plurality of steering modes depending on the environment and job at hand. The change between steering modes may be accomplished by the machine operator as he sits in the cab. In addition the movement of the steering control lever within the cab remains the same regardless of the steering mode in which the machine is being operated.

BRIEF DESCRIPTION OF THE DRAWINGS

FIGS. 4–7 are diagrammatic representations of the control lever and corresponding axle positions of various steering modes in which the steering control apparatus may be operated;

BEST MODE FOR CARRYING OUT THE INVENTION

Figure 1:
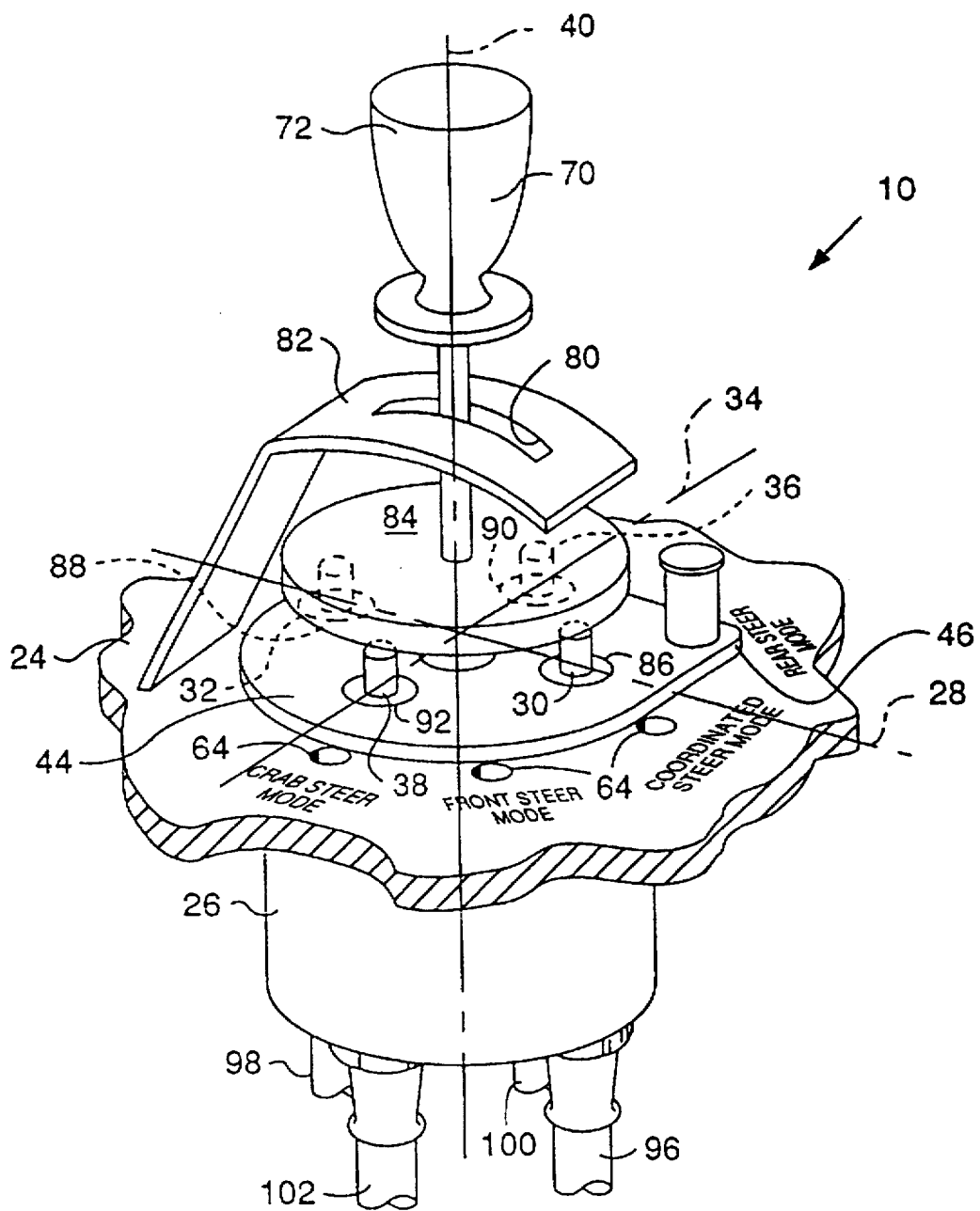
FIG. 1 is an elevational, diagrammatic perspective view of a control lever and module assembly for a control apparatus that embodies principles of the present invention.
Figure 2:
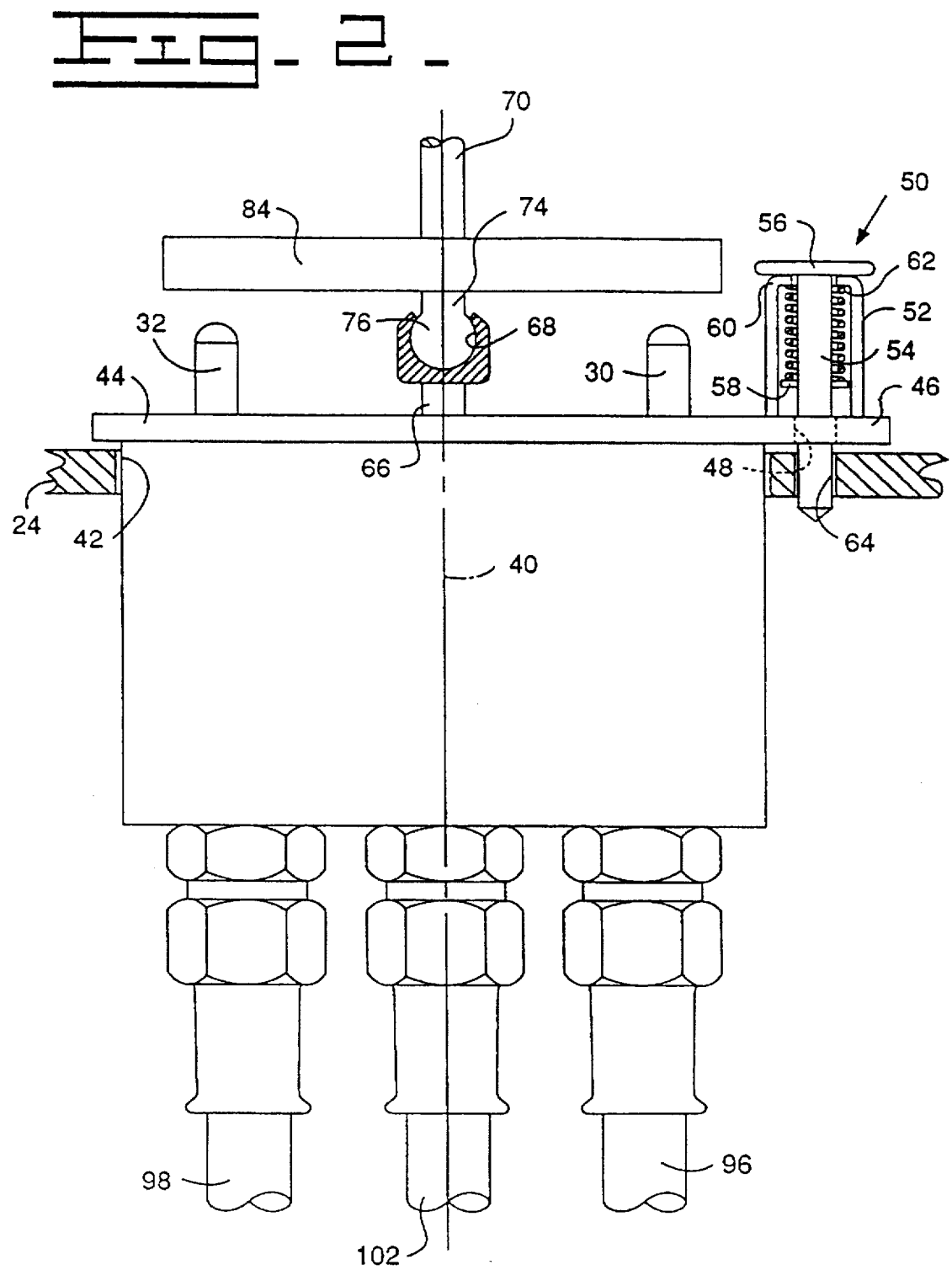
FIG. 2 is a schematic of the control valve and the axle assembly employed by the steering control apparatus that is controlled by the control lever and module disclosed in FIG. 1.

Referring to the drawing, particularly with respect to FIGS. 1 and 2, it can be seen that a control apparatus, in particular a steering control, is shown generally at 10. The steering control is provided to manipulate a plurality of wheel assemblies that are mounted on a pair of axles defined by a machine (not shown). A first pair of wheel assemblies 12 and 14 is mounted on opposite ends of a first or rear axle 16. A second pair of wheel assemblies 18 and 20 is mounted on opposite ends of a second or front axle 22. The steering control 10 is mounted within an operator's station (not shown) of the machine generally in the area of the control console or other suitable housing which is indicated in the drawings by reference numeral 24.

The steering control 10 includes a control module 26 that is rotatably mounted within the housing 24. The control module shown in FIG. 1 includes a plurality of actuators which control the rotation of the wheel assemblies with respect to the axles to which they are mounted as will be described hereinafter. A first pair of actuators are mounted on a first axis 28. First and second actuators 30 and 32 respectively are both positioned at spaced locations on first axis 28 in a first plane that is shown to be generally horizontal. First and second actuators 28 and 30 control the rotation of wheel assemblies 12 and 14 with respect to the first axle 16 in one of a first and second direction. A second pair of actuators are mounted on a second axis 34. A third and fourth actuator 36 and 38 respectively are positioned on the second axis 34 and control the rotation of wheel assemblies 18 and 20 on the second axle in one of a first and second direction. The second axis is positioned in the same plane as that of the first axis 28 but is oriented to extend perpendicularly to the first axis. The point of intersection between the two axes occurs generally along the center of rotation of the control module. The first and second actuators are positioned on opposite sides of the point of intersection between the axes, as are the third and fourth actuators. All of the actuators are equidistantly positioned about the point of intersection. The control module rotates about a third axis 40 which lies in a plane that is generally perpendicular to the plane in which the first and second axes are positioned and is shown to be generally vertically oriented in the drawings.

The control module is journaled for rotation within a hole 42 (FIG. 2) that is defined in the control console housing 24. An end plate 44 caps the upper portion of the control module and defines a plurality of bores through which the actuators 30, 32, 36 and 38 extend. The end plate forms an enlarged flange that overlies the hole 42 and aids in the locating of the control module with respect to the housing. The end plate defines a pointed extension 46 that serves as an indicator to the operator as to which one of a plurality of steering modes the machine is operating. The extension 46 defines a bore 48 (FIG. 2) that receives an indexing means 50 that locates and secures the position of the control module with respect to the housing 24.

Referring to FIG. 2 it can be seen that the indexing means 50 is housed within an upstanding cylindrical member 52 that is positioned concentrically about the bore 48. The cylindrical member 52 receives a locating pin 54 that extends through the bore 48. An enlarged knob portion 56 is defined by the locating pin and is located above the upper extremity of the cylindrical member 52. A roll pin 58 extends through the locating pin 54 at a location that is spaced from an upper flanged portion 60 defined by the cylindrical member 52. A spring 62 is positioned between the upper flange 60 and the roll pin 58 and biases the locating pin 54 downwardly as viewed in FIG. 2, to extend through the bore 48. A plurality of locating holes 64 are positioned in the housing 24 in an arc that is centered around the third axis 40. Each of the locating holes 64 may be positioned in registry with the bore 48 in end plate 44. The locating holes are sufficient in size to receive the locating pin 54. The spring 62 has sufficient force to urge the locating pin 54 into one of the selected locating holes 64 to maintain the control module in one of a corresponding plurality of steering modes as will be described in greater detail hereinafter.

As can be seen in FIG. 2, a mounting shaft 66 is secured to the end plate 44 and extends upwardly therefrom to define a socket 68 on its upper extremity. The shaft 66 is substantially centered along the third axis 40 and rotates thereabout with the rotation of the control module 26.

A control lever 70 defines a first end portion 72 (FIGS. 1 and 8) that defines a gripping portion and a second portion that defines a substantially spherical member 76. The spherical member is sized for receipt within the socket 68 defined by the mounting shaft 66 and is captured therein in a well known manner to define a spherical joint. The control lever is captured for movement within a slot 80 defined by a gate plate 82 (FIGS. 1 and 8) that is in turn mounted to the housing 24. The slot is positioned in a preselected plane that is perpendicular to the first plane in which the axes 28 and 34 are located, as viewed in FIG. 1. Being so mounted, the control lever may only be moved in a first and second direction on either side of the third axis 40 which represents a neutral position. With respect to the drawings, the control lever is limited to movement to the right and left of the third axis 40. The spherical joint permits relative rotation between the control module 26 and the control lever 70 and the control module is moved between steering modes while permitting the movement of the control lever within the slot 80. While a spherical joint is described in the above application, it is to be understood that another connection such as a U-joint or other similar connection may be used without departing from the intent of the described connection.

An actuator plate 84 (FIGS. 1 and 7) is secured to the control lever 70 at a location that is directly above the actuators 30, 32, 36 and 38. The actuator plate 84 is shown to be substantially round and must be of sufficient diameter or other shape, to engage at least two of the actuators simultaneously depending upon the position of the control module.

The actuators 30, 32, 36 and 38 are all shown to be plunger type actuators that communicate a signal to a steering control valve 86 to control the rotation of the wheel assemblies with respect to the first and second axles 15 and 22. While it is to be understood that this signal could be communicated in a number of different ways such as electronically, hydraulically or a combination of both, it is shown to be transmitted using a hydraulic circuitry.

Figure 3:
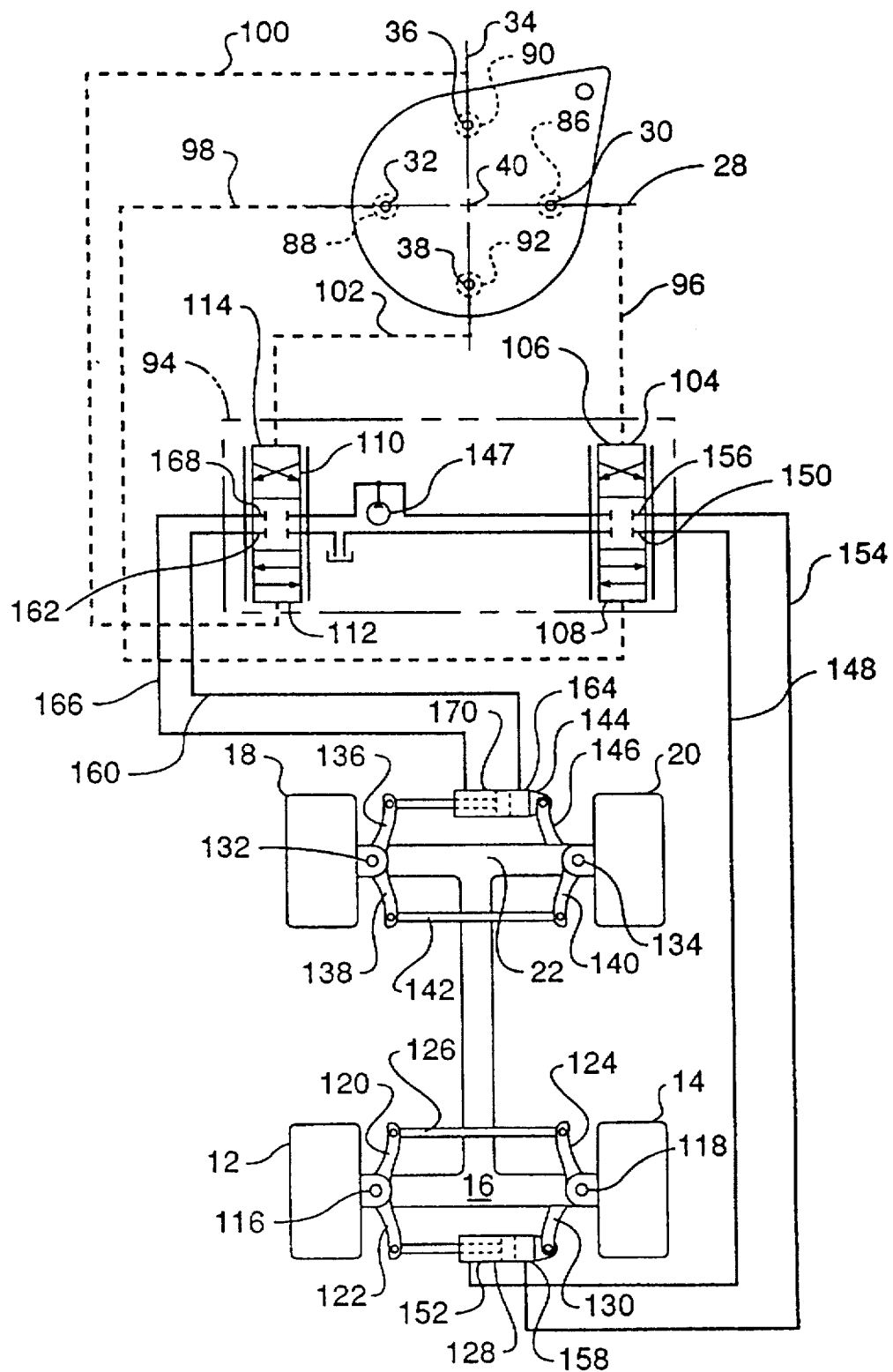
FIG. 3 is a diagrammatic section view taken along lines 3—3 of FIG. 1.

In the disclosed embodiment of FIGS. 1–3, the control module houses four pilot valves 86, 88, 90 and 92 that correspond to the actuators 30, 32, 36 and 38 respectively. The pilot valves are communicated to a steering control valve 94 via fluid conduits or lines 96, 98, 100 and 102. Referring specifically to FIG. 3, it can be seen that the pilot valves 86 and 88 are communicated to opposite ends of a valve body 104 defined by the steering control valve. Line 96 communicates pilot valve 86 with a first side 106 of the valve body 104 to shift a valve spool (not shown) in a first direction, while line 98 communicates pilot valve 88 with a second side 108 of the valve body 104 to cause the shifting of the valve spool in the opposite direction. Likewise, pilot valves 90 and 92 are communicated with the opposite ends of a second valve body 110 defined by the steering control valve 94 to control the reciprocation of a valve spool (not shown) portioned therein. Line 100 communicates pilot valve 90 with a first side 112 of valve body 110 to shift the valve spool in the first direction, while line 102 communicates pilot valve 92 with a second side 114 of the valve body 110 to shift the valve spool in a second or opposite direction.

Each of the wheel assemblies 12 and 14 is rotatably mounted on the opposite ends of the rear axle 16 by a vertically oriented king pin 116 and 118 respectively. The wheel assembly 12 has a pair of steering arms 120 and 122 that extend horizontally fore and aft respectively of the axle 16. Wheel assembly 14 has a single steering arm 124 that extends forwardly of the axle 16 and is connected to the steering arm 120 of wheel assembly 12 by a tie rod 126. A steering cylinder 128 has a rod end connected to the steering arm 122 of wheel assembly 12 and a head end that is connected to a mounting bracket 130 defined by axle 16.

The wheel assemblies 18 and 20 are mounted in a very similar manner to the front axle 22. Each is pivotally mounted to an opposite end of the axle 22 by a vertically oriented king pin 132 and 134. Wheel assembly 18 has a forwardly extending steering arm 136 and a rearwardly extending steering arm 138. Wheel assembly 20 has a single, rearwardly extending steering arm 140 and is interconnected with the rearward steering arm 138 of the wheel assembly 18 by a tie rod 142. A steering cylinder 144 is interconnected between the forwardly extending steering arm 136 and a mounting bracket 146 defined by axle 22.

Rotation of wheel assemblies 12 and 14 results from the communication of pressurized fluid from a pump 147, through the steering control valve 94 and valve body 104 and then to the steering cylinder 128. A fluid conduit 148 is interconnected between a first port 150 in the first valve body 104 of the steering valve and a rod end 152 of the steering cylinder 128. Another fluid conduit 154 is interconnected between a second port 156 of the valve body 104 and the head end 158 of the steering cylinder 128. When pressurized fluid is communicated with the rod end 152, both wheel assemblies are rotated in a first or counter-clockwise direction as viewed in the drawings. Conversely, when pressurized fluid is communicated to the head end 158 of the steering cylinder 128, both wheel assemblies 12 and 14 are rotated in a second, clockwise direction.

The steering of the wheel assemblies 18 and 20 mounted on the second or front axle 22 are controlled in much the same manner. A fluid conduit 160 is interconnected between a first port 162 defined in the second valve body 110 and the head end 164 of the steering cylinder 144. Another fluid conduit 166 is interconnected between a second port 168 of the second valve body 110 and the rod end 170 of the steering cylinder 144. When pressurized fluid is introduced into the head end 164 of the steering cylinder 144, the wheel assemblies 18 and 20 are rotated in a first or counter-clockwise direction. Conversely, when fluid pressure is introduced into the rod end 170 of the steering cylinder 144, the wheel assemblies are rotated in a second, clockwise direction.

While the steering control valve and the steering cylinders 128 and 144 are described above as being controlled by a pilot valves and a pilot circuit, it is to be understood that the same control can be accomplished utilizing electronic control. While it is not specifically shown, it is to be understood that the actuators 30, 32, 36 and 38 could be adapted to actuate pilot valves 86, 88, 90 and 92, electronically. The actuators could be utilized as electric switches that would in turn control solenoids on opposite ends of the first and second valve bodies 104 and 110 to shift the valve spools therein between their first and second positions.

Figure 8:
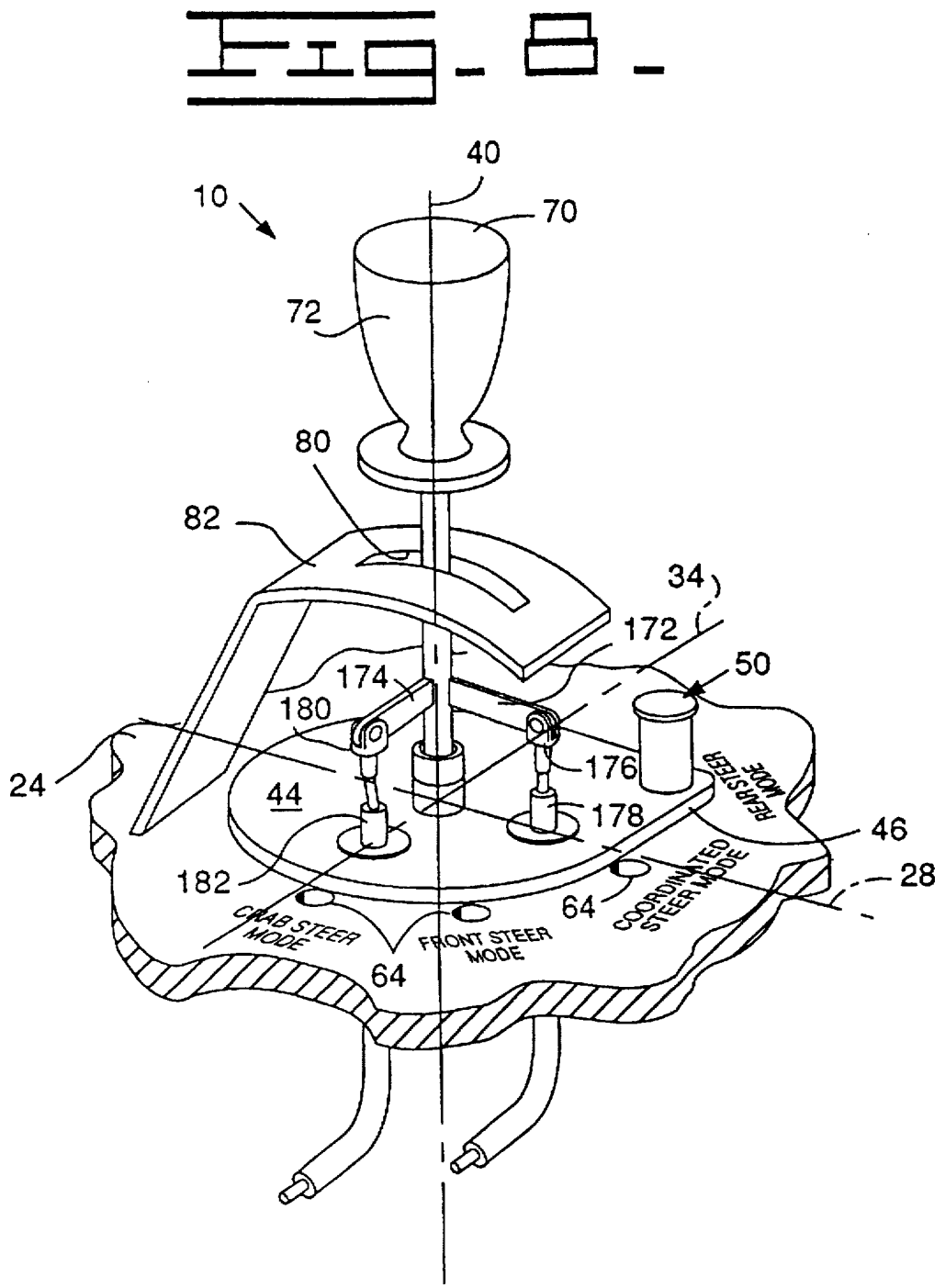
FIG. 8 is a view similar to that of FIG. 1 showing an alternate embodiment of the present invention.

Turning to FIG. 8, an alternate embodiment of the steering control may be seen. The following description will use common reference numerals to identify identical components in both embodiments. The steering control shown in FIG. 8 includes an end plate 44 for rotation about the third axis 40 and an indexing means 50 that are substantially the same as those previously described. The control lever 70 is positioned within the slot 80 in the gate plate 82 for movement in a second plane on either side of the third axis 40. The control lever is mounted to the end plate 44 by way of a spherical coupling as previously described or other means that will allow the control module to be rotated about the third axis 40 while permitting the control lever to be moved left and right in the second plane.

The control lever 70 defines a first arm member 172 that extends from the control lever at a location that is substantially midway between the end plate 44 and the gate plate 82. A second arm member 174 is mounted to the control lever adjacent the first arm member and is oriented 90 degrees about the third axis 40 from the first arm.

The first arm 172 is connected to a clevised end 176 of a first push-pull cable assembly 178. The cable assembly is attached to a valve spool (not shown) in the first valve body 104 and will manually move the valve spool between a first and second position to selectively direct fluid pressure through the steering control valve 94, through the first or second ports 150 or 156. In doing so the fluid pressure will be directed to either of the rod or head ends 152 or 158 respectively to rotate the wheel assemblies 12 and 14 in the first and second directions.

The second arm 174 is connected to a clevised end 180 of a second push-pull cable assembly 182. The second cable assembly is attached to a valve spool (not shown) in the second valve body 110 and will manually move the valve spool between a first and second position wherein fluid pressure will be selectively directed through the steering control valve 94, through the first or second ports 162 and 168 respectively. In doing so the fluid pressure will be directed to the head or rod ends 164 or 170 of the steering cylinder 144 to rotate the wheel assemblies 18 and 20 in either of the first or second directions.

The release of the indexing means 50 from engagement with one of the locating holes 64 will allow the control module 26 and the control lever 70 to be rotated about the third axis to change the orientation of the first and second arms 172 and 174 with respect to the second plane in which the control lever must move. By doing this, one or both of the push-pull cables will be actuated, depending on the positioning of the indexing means, to control the wheel assemblies 12, 14, 18 and 20 in one of the plurality of available steering modes.

Figure 14:
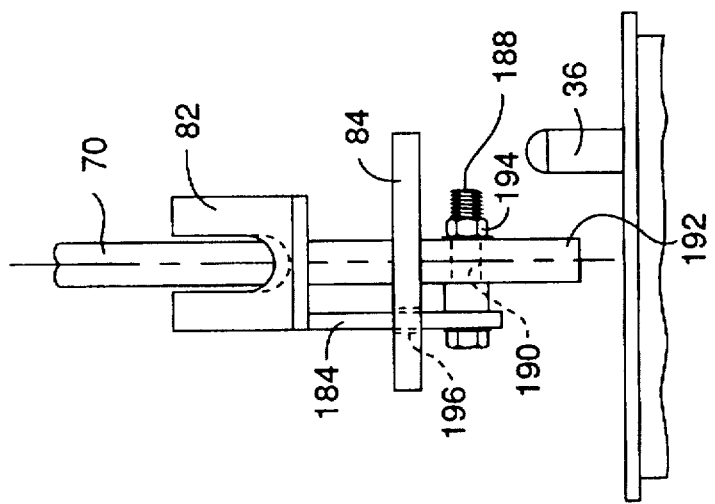
FIG. 14 is a diagrammatic side view of the mounting shown in FIG. 13 taken along lines 14—14.
Figure 13:
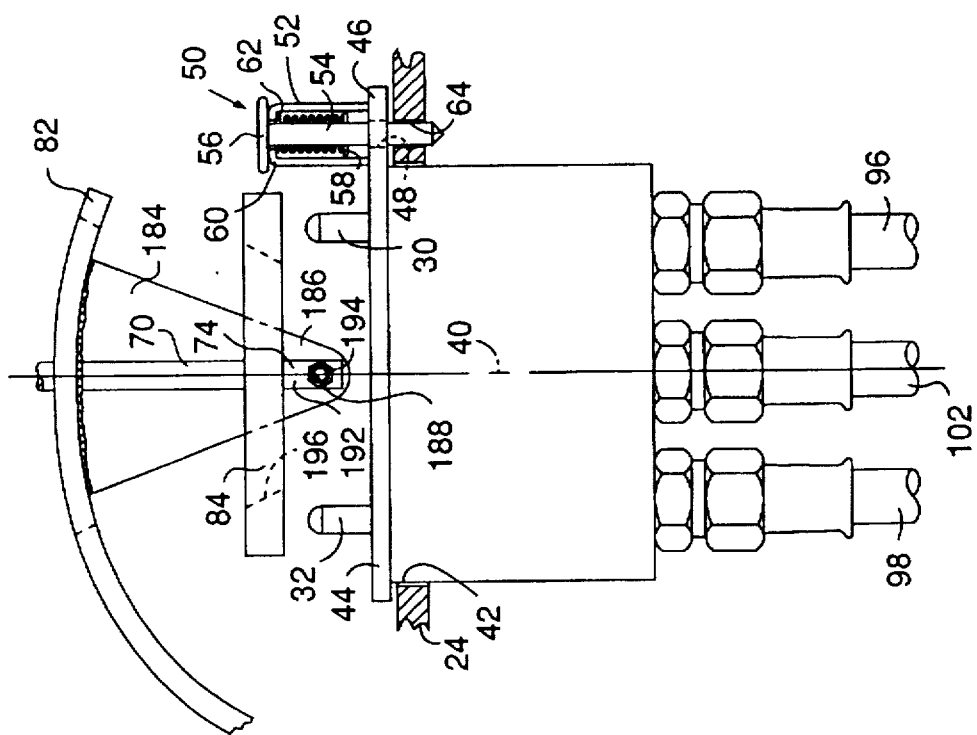
FIG. 13 is a view similar to that of FIG. 2 showing an alternate embodiment of the mounting of a control lever.

Another embodiment of the mounting of the control lever 70 is shown in FIGS. 13 and 14. In this embodiment, the gate plate 82 is shown to define a downwardly directed flange 184 that is mounted to the gate plate adjacent the slot 80. The lower end portion 186 defines a generally horizontally directed pivot shaft 188. The pivot shaft 188 is adapted for insertion into a bore 190 that is defined in a lower end portion 192 of the control lever 70. The control shaft is maintained on the pivot shaft 188 by any suitable fastening means such as a nut 194. The downwardly directed flange 184 extends through a slot 196 that is defined in the actuator plate 84 which is large enough to allow the control lever to pivot freely along slot 80 in the first and second directions. The actuator plate 84 is fixedly secured to the lower end portion 186 of the control lever for movement therewith and subsequent contact with the actuators 30, 32, 36 and 38 in a manner identical to that previously described.

While the control apparatus in the illustrated embodiment is shown and described in conjunction with a steering control mechanism, it is to be understood that the control apparatus may be applied to the control of any of several machine functions without departing from the principles of the invention.

INDUSTRIAL APPLICABILITY

In the operation of the steering control 10 as shown in FIGS. 1–7, it is seen that the indexing means 50 may be moved between one of four steering modes. To select a steering mode, the operator must disengage the pin 54 (FIG.

2) of the indexing means 50 by lifting the knob 56 a distance sufficient to clear the pin from engagement with one of the locating holes 64 defined in the underlying housing 24. When the pin is cleared from engagement with any of the locating holes, the control module may be rotated about the third axis 40.

To achieve "Rear Wheel Steering" as indicated in FIG. 4, the indexing means 50 is moved to engage the locating hole 64 adjacent the appropriate indicia as is shown in FIG. 1. Being so positioned, the first axis 28 is aligned parallel to the second plane in which the control lever 70 moves. In this position, first and second actuators 30 and 32 respectively are positioned along the first axis 28. When the control lever 70 is moved to the right as viewed in the drawings, actuator plate 84 will be brought into contact with actuator 30. Depression of actuator 30 will cause the pilot valve 86 to send a pilot signal to the first valve body 104 via pilot line 96 to shift the valve spool to a first position. In this position, main system pressure from the pump 147 is directed through the valve body 104 to port 150. From port 150 the fluid is communicated via line 148 to the rod end of steering cylinder 128 mounted on the first or rear axle 16. The rod end of the steering cylinder 128 is retracted and the wheel assemblies 12 and 14 are rotated in a first or counter-clockwise direction to cause the machine to steer to the right. The steering is thus coordinated with the movement of the control lever 70 to the right. When the control lever is moved to the left (not shown), the actuator plate 84 will be brought into contact with actuator 32 to actuate pilot valve 88 (FIG. 3). Pilot pressure will then be communicated to the second side 108 of valve body 104 to shift the valve spool to its second position. This will in turn, direct pressurized fluid from pump 147 to port 156. The fluid pressure will then be communicated through conduit 154 to the head end 158 of steering cylinder 128. The cylinder will thus be extended and the wheel assemblies 12 and 14 will be rotated in a clockwise direction to cause the machine to steer to the left.

Referring now to FIGS. 3 and 5 it can be seen that the indexing means 50 has been disengaged from the "Rear Wheel Steer Mode" and the control module has been rotated approximately 45 degrees from the position shown in FIG. 4. In this position, the pin 54 of the indexing means now resides in the locating hole 64 that is adjacent the steering mode indicated by the "Coordinated Steer" indicia. Referring to FIG. 5, it can be seen that the axes 28 and 34 have been rotated 45 as have the actuators 30, 32, 36 and 38. Being so positioned, both actuators 30 and 36 are simultaneously engaged by the actuator plate 84 when control lever 70 is moved to the right. Similarly, actuators 32 and 38 are simultaneously engaged by the actuator plate when the control lever is moved to the left. When actuators 30 and 36 are engaged, the respective pilot valves 86 and 90, shown in FIG. 3, are actuated. Pilot valve 86 causes the steering cylinder 128 to retract and rotate wheel assemblies 12 and 14 in the counter-clockwise direction as previously described. Pilot valve 90 however sends a pilot signal via line 100 to the first side 112 of the second valve body 110 causing it to shift to a first position. In this position, pressurized fluid from pump 147 is directed through port 168 to fluid conduit 166 whereupon it is then communicated to the rod end 170 of steering cylinder 144. This causes the steering cylinder 144 to be retracted and the wheel assemblies 18 and 20 to be rotated in a second direction or clockwise as shown in the drawings. When the control lever is shifted to the left, actuators 32 and 38 are engaged by actuator plate 84 to actuate pilot valves 88 and 92 respectively, and the opposite results are obtained. Actuation of the pilot valve 88 will cause the steering cylinder 128 to extend and rotate the wheels in the second, or clockwise direction, while actuation of pilot valve 92 will cause the steering cylinder 144 to be extended to cause the wheel assemblies 18 and 20 to rotate in the first direction.

Referring now to FIGS. 3 and 6, it can be seen that the indexing means 50 has been disengaged and the control module 26 has been rotated another 45 degrees. In this position, the indexing means is re-engaged with a locating hole 64 that is adjacent the indicia "Front Wheel Steer". In this configuration, actuators 36 and 38 are located along the second plane in which the control lever 70 is moved in the respective right and left directions. These are the only two actuators that are contacted and they control only the movement of the front steering cylinder 144. Therefore, when actuator 36 is engaged, the steering cylinder 144 is retracted as previously described to cause the wheel assemblies 18 and 20 to rotate in the second, clockwise direction. When the control lever is moved to the left along the second plane, contact with actuator 38 will cause the steering cylinder 144 to extend, as previously described, causing the wheel assemblies 18 and 20 to rotate in the counter-clockwise direction.

Figure 7:
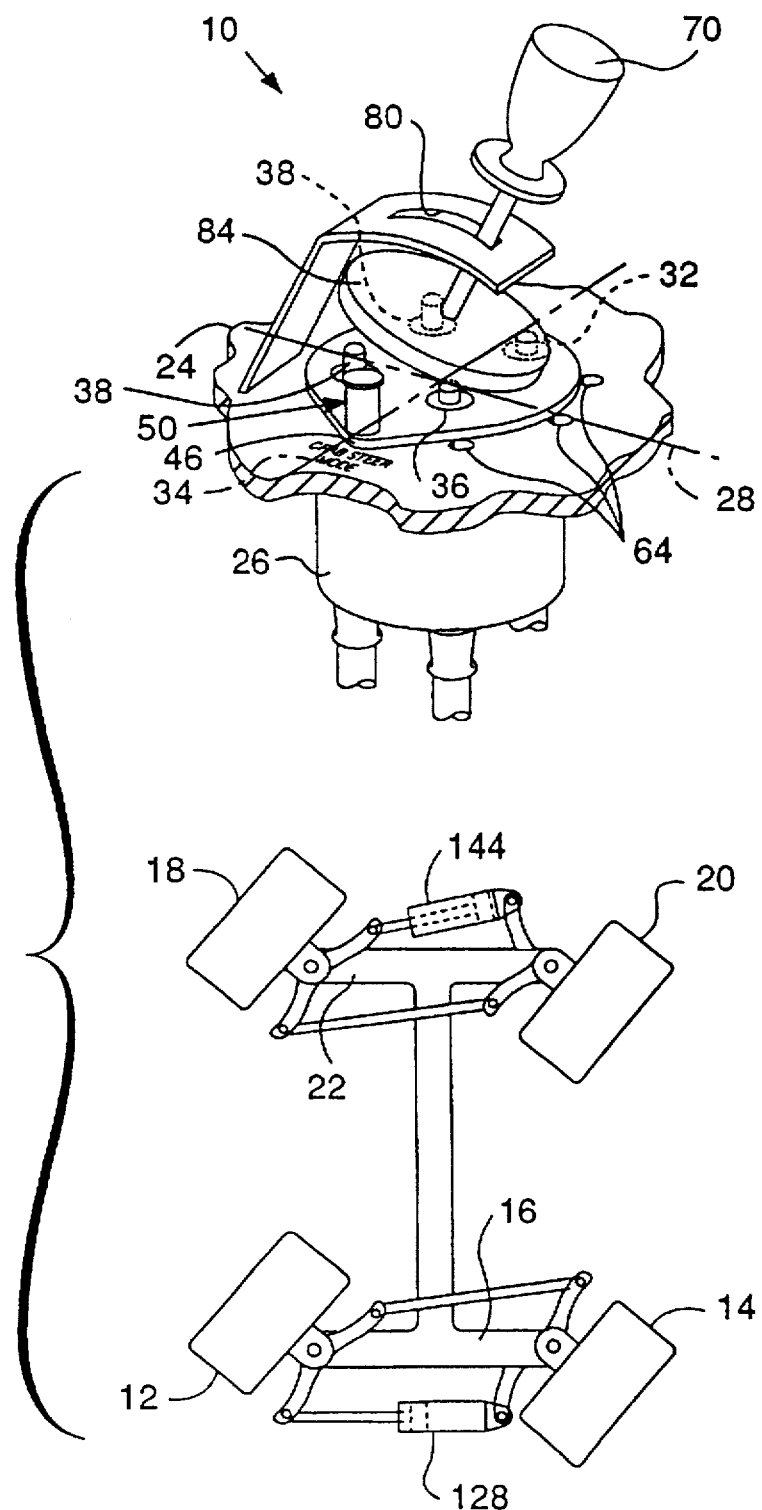

Referring now to FIGS. 3 and 7, it can be seen that the indexing means 50 has been disengaged to allow the control module 26 to be rotated yet another 45 degrees. In this position, the indexing means is engaged with a locating hole 64 that is adjacent the "Crab Steer" indicia. In this position, actuators 32 and 36 are simultaneously engaged by the actuator plate 84 when the control lever 70 is moved to the right and actuators 30 and 38 are simultaneously engaged when the control lever is moved to the left. When actuators 32 and 36 are engaged, actuator 32 causes the steering cylinder 128 on the rear axle to extend, thereby rotating wheel assemblies 12 and 14 toward the second or clockwise direction shown in FIG. 7, while actuator 36 also causes the front steering cylinder 144 to retract to also rotate the wheel assemblies 18 and 20 in the second or clockwise direction. Movement of the control lever to the left will cause the wheel assemblies on both axles to rotate in the opposite direction.

Figure 9:
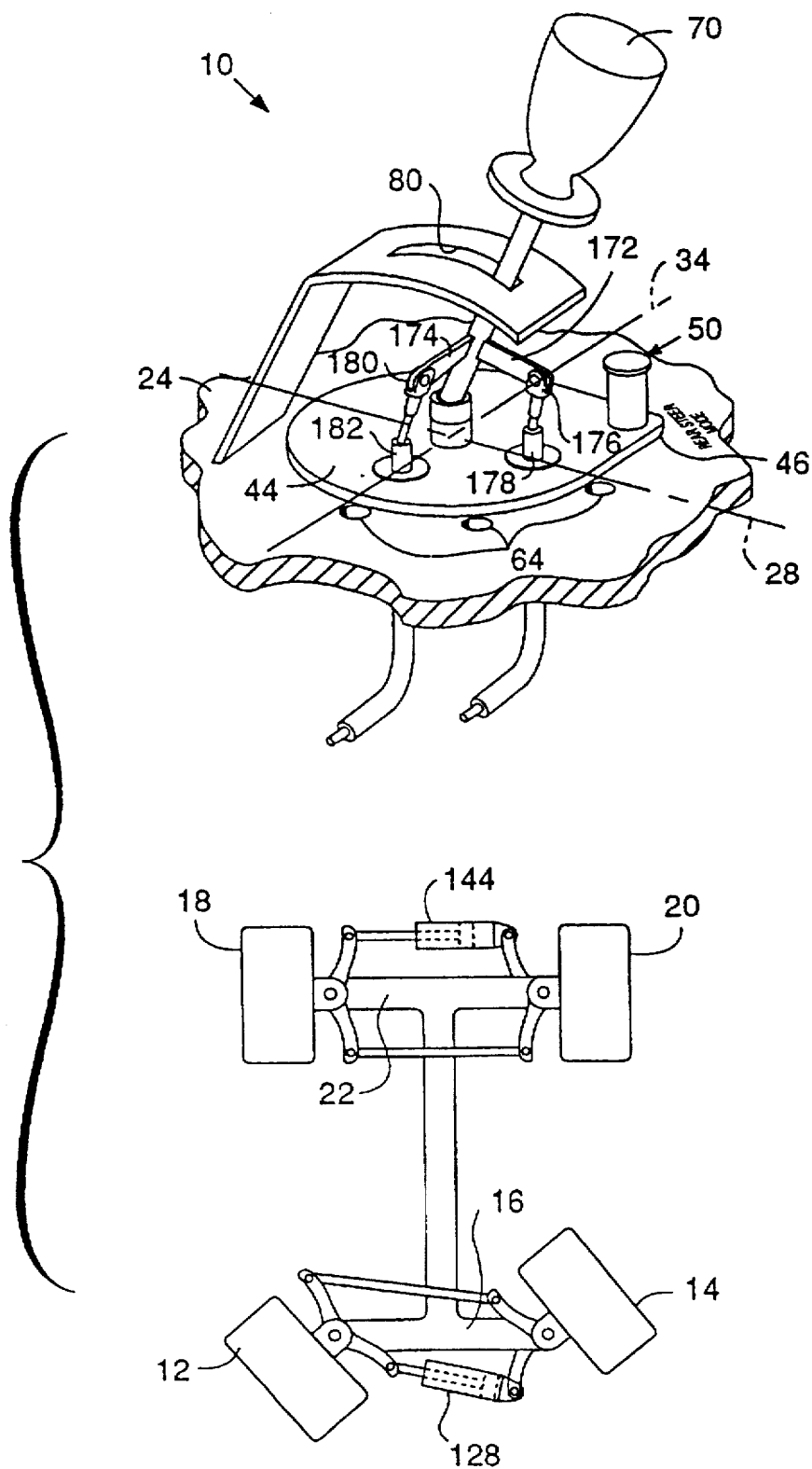
FIGS. 9–12 are diagrammatic representations of the control lever and corresponding axle positions of the various steering modes in which the steering apparatus shown in FIG. 8 may be operated.

In the alternate embodiment disclosed in FIGS. 8–12, it can be seen that the actuators 30, 32, 36 and 38 of the control module 26 are replaced by a pair of push-pull cables 178 and 182. In FIGS. 8 and 9, it can be seen that the indexing means 50 has been located to operate in the "Rear Wheel Steer" mode. In this position, the first arm 172 is located along first axis 28 while the second arm 174 is located along the second axis 34. When the control lever 70 is moved to the right, the first cable is pushed downward which in turn causes the valve spool in the first valve body 104 to shift to the first position as previously described with respect to FIG. 3. In this position, the steering cylinder 128 is caused to rotate the rear wheels 12 and 14 in the first direction. Movement of the control lever to the left, results in the movement of the valve spool, the steering cylinder and therefor the rear wheels in the opposite direction. Since the second arm 174 is on the second axis 34, movement of the control lever does not affect the valve spool in the second valve body.

Figure 10:
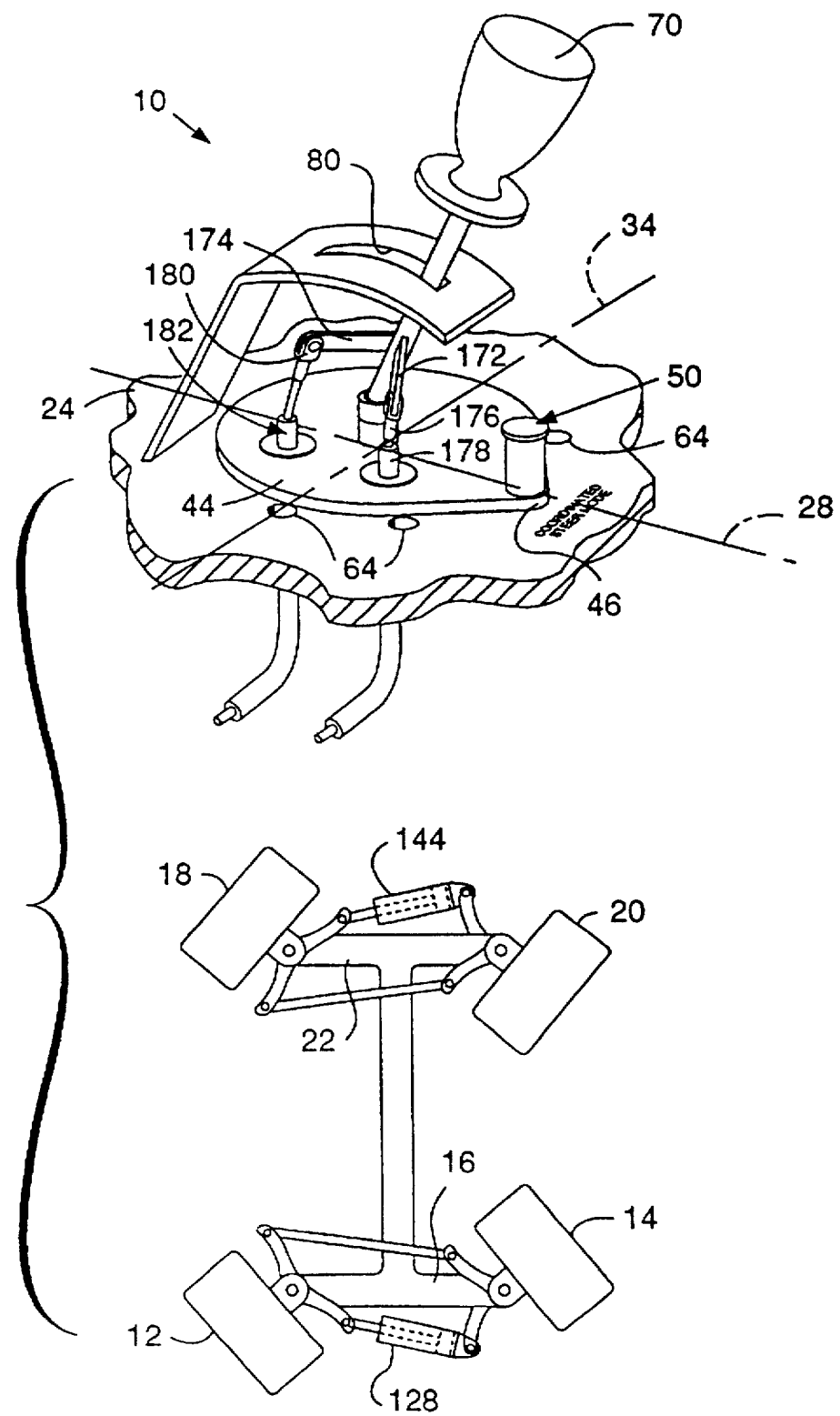

When the control module 26 is in the "Coordinated Steering" mode as is shown in FIG. 10, both the first and second arms 172 and 174 respectively, are rotated 45 degrees. For purposes of illustration, axes 28 and 34 will remain stationary and the positions of the arms 172 and 174 will be described with respect thereto. In this position, first and second arms 172 and 174 are positioned midway between the first and second axes 28 and 34. Also in this position, the valve spools in both valve bodies 104 and 110 are manipulated simultaneously. When the control lever is moved to the right, the valve spool in the first valve body 104 is moved to its first position to rotate the rear wheels counter clockwise, while the valve spool in the second valve body 110 is moved to its first position to rotate the front wheels in the clockwise direction. Movement of the control lever in the opposite direction will cause opposite movement of the valve spools within the respective valve bodies and therefore the opposite rotation of both the front and rear wheels.

Figure 11:
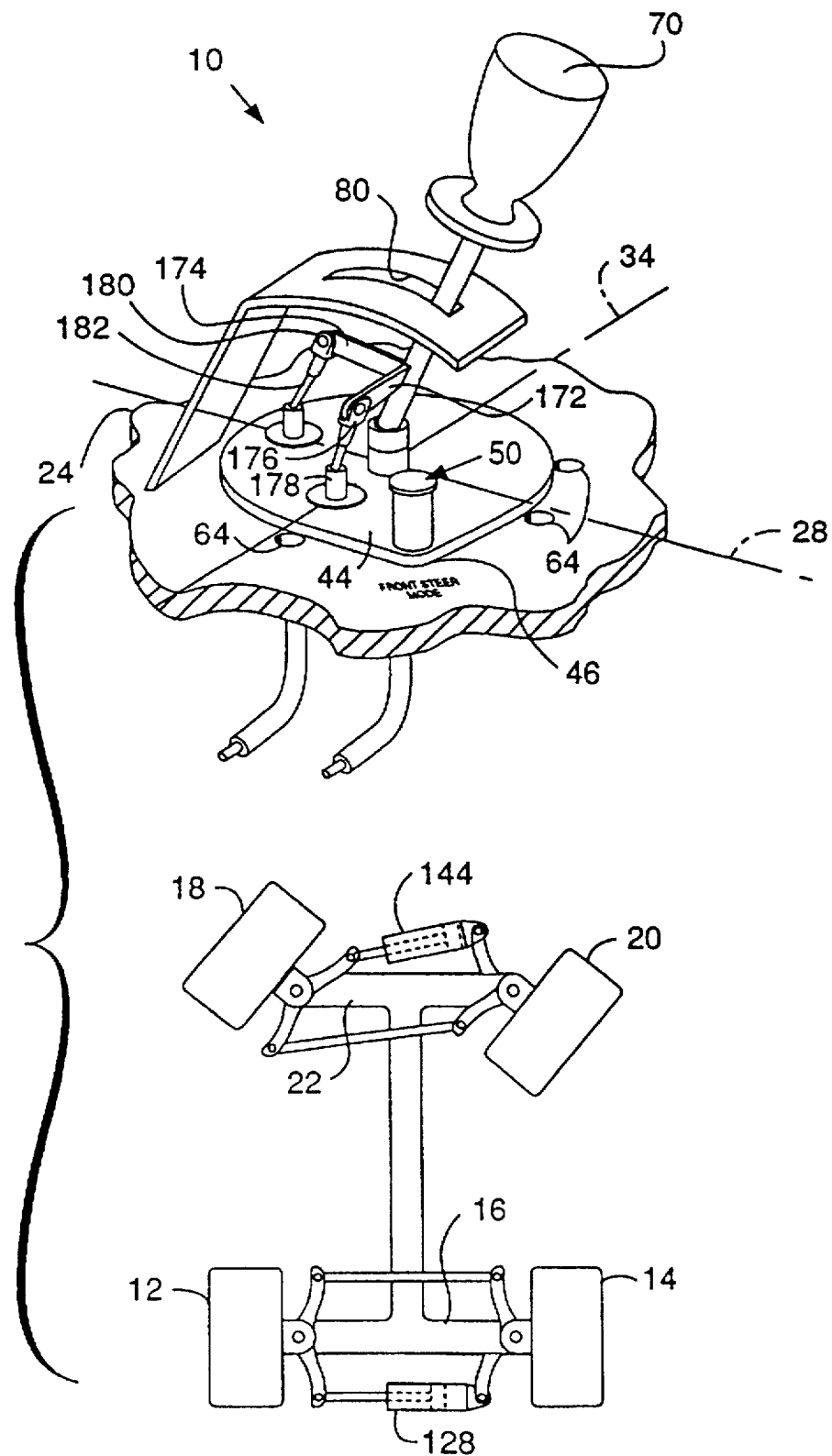

When the indexing means 50 is disengaged and the end plate 44 is rotated to select the "Front Wheel Steering" mode, as shown in FIG. 11, the first and second arms 172 and 174 are positioned parallel to the axes 28 and 34 once again. In this position, second arm 174 is affected by movement of the control lever 70 while the first arm 172 is not. When the control valve is moved to the right, the cable 182 is pulled upward to shift the valve spool to the first position to rotate the front wheels in the second direction (clockwise). When the control lever is moved to the left, the cable 182 is pushed downward and the valve spool is shifted to its second position to rotate the front wheels in the first direction (counter-clockwise).

Figure 12:
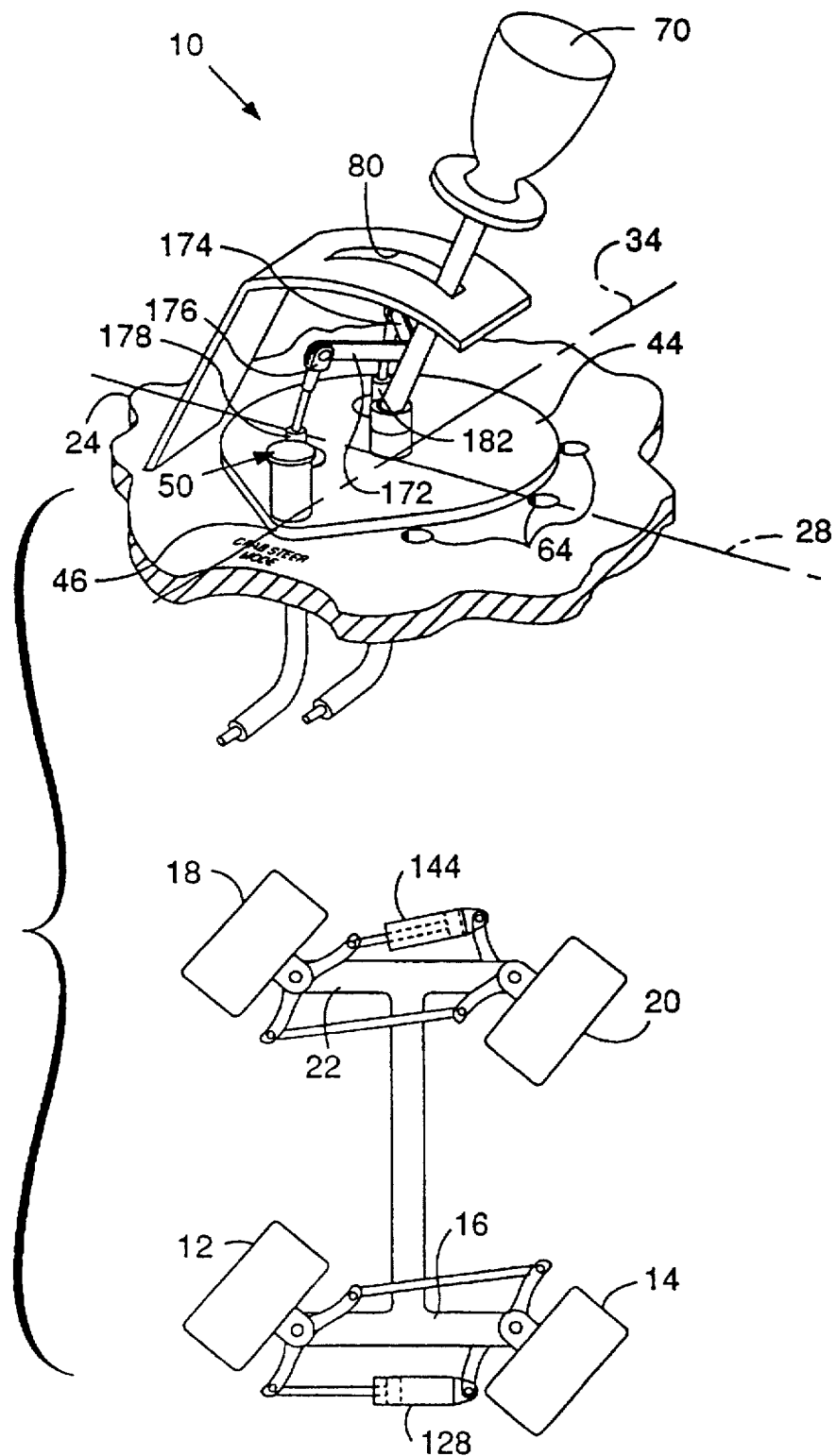

When the end plate 44 is rotated to select the "Crab Steer" mode, as is shown in FIG. 12, the first and second arms 172 and 174 respectively, are again positioned midway between the axes 28 and 34. When in this position, both cables are pulled upward when the control lever is moved to the right. When this happens, the both front and rear wheels are rotated in the second direction. Movement of the control lever to the left will cause both wheels to rotate in the opposite direction.

With a steering control apparatus as disclosed above, it can be seen that a plurality of steering modes are available for the same machine with very little effort required to switch from one to the other. The various steering modes may be selected depending on the environment in which the machine is to be operated making the machine highly versatile. In addition, selection of the various modes may be done by an operator within seconds as he remains at his location within the cab of the machine. Finally, manipulation of the machine in the various modes requires identical movement of the steering control lever in all steering modes. This is highly desirable in that it decreases the level of skill required by an operator in order to efficiently manipulate the machine.

Other aspects, objects and advantages of this invention may be obtained from a study of the drawings, the disclosure and the appended claims.

I claim:

1. A control apparatus for a machine having first and second axles and a pair of steerable wheel assemblies rotatably mounted on each of the respective axles, comprising:

a housing;
   a control module having a plurality of actuators mounted therein for selectively controlling the rotation of the wheel assemblies on the respective axles, said control module being rotatable with respect to the housing to select one of a plurality of steering modes under which the machine may be controlled; and
   a control lever pivotally mounted with respect to the control module and being moveable in a first and second direction to actuate selected ones of the actuators in one of said plurality of steering modes.

2. The control apparatus as set forth in claim 1 wherein first and second actuators are mounted in the control module along a first axis that lies in a first plane, said first and second actuators being adapted to control the rotation of the wheel assemblies on the first axle in a first and second direction.

3. The control apparatus as set forth in claim 2 wherein third and fourth actuators are mounted in the control module along a second axis that is positioned in the first plane in a perpendicular orientation to the first axis, said third and fourth actuators being adapted to control the rotation of the wheel assemblies on the second axle in a first and second direction.

4. The control apparatus as set forth in claim 3 wherein a gate plate having a laterally extending slot defined therein is secured to the housing in a manner to capture the control lever within the slot for lateral movement in first and second directions that correspond with the first and second direction of rotation of the wheel assemblies, said slot being positioned along a second plane that is substantially perpendicular to the first plane.

5. The control apparatus as set forth in claim 4 wherein an actuator plate is mounted to the control lever to engage one or more of the actuators upon movement of the control lever in either of the first or second directions.

6. The control apparatus as set forth in claim 5 wherein the control module is positioned in a preselected location with respect to the control lever and is operable in a first mode when the control lever is moved in a first direction to bring the actuator plate into contact with the first actuator to cause the wheel assemblies on the first axle to rotate in the first direction, and the control lever is movable in the second direction to bring the actuator plate into engagement with the second actuator to cause the wheel assemblies on the first axle to rotate in a second direction.

7. The control apparatus as set forth in claim 5 wherein the control module is rotatable with respect to the control lever to a second preselected position to operate in a second mode wherein the control lever is moved in a first direction to bring the actuating plate into contact with the first and third actuators to cause the wheel assemblies on the first axle to rotate in a first direction and the wheel assemblies on the second axle to rotate in the second direction and the control lever is moved in the second direction to bring the actuating plate into contact with the second and fourth actuators to cause the wheel assemblies on the first axle to rotate in the second direction and the wheel assemblies on the second axle to rotated in the first direction.

8. The control apparatus as set forth in claim 5 wherein the control module is rotatable with respect to the control lever to a third preselected position to operate in a third mode wherein the control lever is moved in a first direction to bring the actuator plate into contact with the third actuator to cause the wheel assemblies on the second axle to rotate in the second direction and the control lever is moved in the second direction to bring the actuator plate into contact with the fourth actuator to cause the wheel assemblies on the second axle to rotate in the first direction.

9. The control apparatus as set forth in claim 5 wherein the steering control module is rotatable with respect to the control lever to a fourth preselected position to operate in a fourth mode wherein the control lever is moved in a first direction to bring the actuator plate into contact with the second and third actuators to cause the wheel assemblies on the first and second axles to rotate in the second direction and the control lever is movable in the second direction to bring the actuator plate into contact with the third and fourth actuators to cause the wheel assemblies on the first and second axle to rotate in the first direction.

10. A control apparatus for a machine having first and second axles and a pair of steerable wheel assemblies mounted on each of the respective axles, comprising:

a housing;

a control module rotatably mounted to the housing;

a first pair of actuators mounted in the control module along a first axis that is positioned in a first plane, said first pair of actuators being adapted to selectively control the movement of the wheel assemblies mounted on the first axle in one of first and second directions;

a second pair of actuators mounted in the control module along a second axis that is positioned in the first plane at an orientation that is perpendicular to the first axis, said second pair of actuators being adapted to selectively control the movement of the wheel assemblies mounted to the second axle in one of first and second directions;

a control lever pivotally mounted to the control module and being moveable in a second plane that is perpendicular to the first plane;

an actuator plate secured to the control lever for movement therewith, said actuator plate being adapted to selectively engage one or more of the first and second pairs of actuators; and means for rotating the control module with respect to the actuator plate to provide selective engagement between the actuator plate and the actuators.

11. The control apparatus as set forth in claim 10 wherein the housing is an implement control console positioned in an operator's station of a construction machine.

12. The control apparatus as set forth in claim 10 wherein a gate plate having a laterally extending slot defined therein is secured to the housing in a manner to capture the control lever within the slot for lateral movement in first and second directions that are on opposing sides of a centrally disposed neutral position, said slot being positioned along a second plane that is substantially perpendicular to the first plane.

13. The control apparatus as set forth in claim 12 wherein the first and second axes intersect at a generally central location defined by the control module.

14. The control apparatus as set forth in claim 13 wherein the first and second pairs of actuators are positioned equidistantly about the point of intersection of the first and second axes.

15. The control apparatus as set forth in claim 12 wherein the first pair of actuators includes a first actuator that is adapted to cause the wheel assemblies on the first axle to rotate in a first direction upon actuation thereof and a second actuator that is adapted to cause the wheel assemblies on the first axle to rotate in a second direction upon actuation thereof.

16. The control apparatus as set forth in claim 15 wherein the second pair of actuators includes a third actuator that is adapted to cause the wheel assemblies on the second axle to rotate in a first direction upon actuation thereof and a fourth actuator that is adapted to cause the wheel assemblies on the second axle to rotate in a second direction upon actuation thereof.

17. The control apparatus as set forth in claim 16 wherein the control module is rotatable about a third axis to a plurality of positions to provide a plurality of steering modes for the machine.

18. The control apparatus as set forth in claim 17 wherein the plurality of steering modes provided by the control module includes:

a first mode wherein the actuator plate will engage the first actuator when the control lever is moved in the first direction and the second actuator when the control lever is moved in the second direction;

a second mode wherein the actuator plate will engage the first and third actuators when the control lever is moved in the first direction and the second and fourth actuators when the control lever is moved in the second direction;

a third mode wherein the actuator plate will engage the third actuator when the control lever is moved in the first direction and the fourth actuator when the control is moved in the second direction; and a fourth mode wherein the actuator plate will engage the second and fourth actuators when the control lever is moved in the first direction and the first and third actuators when the control lever is moved in the second direction.

19. A control apparatus for a machine having first and second axles and a pair of steerable wheel assemblies mounted on opposing ends of each of the respective axles, comprising:

a housing;

a control module rotatably mounted to the housing;

a first actuator mounted in the control module for reciprocating movement within the control module, said actuator being adapted to selectively control the rotation of the first pair of wheel assemblies with respect to the first axle in a first and second direction;

a second actuator mounted in the control module for reciprocating movement within the control module, said second actuator being adapted to selectively control the rotation of the second pair of wheel assemblies with respect to the second axle in a first and second direction;

a control lever pivotally mounted with respect to the control module and being moveable in a first and second direction in a preselected plane with respect to the control module; and means for rotating the control module with respect to the preselected plane of movement of the control lever to provide selective reciprocation of one or both of the actuators to provide a plurality of steering modes for the machine.

20. The control apparatus as set forth in claim 19 wherein the first actuator is a push-pull cable mechanism that is connected to a first lever arm that extends from the control lever and the second actuator is a push-pull cable mechanism that is mounted to a second lever arm, said second lever arm being mounted to the control lever at a location that is radially offset from the first lever arm by 90 degrees.

21. The control apparatus as set forth in claim 20 wherein the control module is adapted for rotation with respect to the control lever for a first mode of steering wherein the first lever arm is positioned to extend parallel to the preselected plane and the second lever arm is positioned normal to said plane, said first lever arm being moveable with the control lever to control the rotation of the first pair of wheel assemblies with respect to the first axle.

22. The control apparatus as set forth in claim 20 wherein the control module is adapted for rotation with respect to the control lever to a second mode of steering wherein the first and second lever arms are positioned at a preselected angle with respect to the preselected plane and movement of said control lever in either of its first and second directions will control the rotation of both the first and second pairs of wheel assemblies in opposite directions with respect to the first and second axles.

23. The control apparatus as set forth in claim 20 wherein the control module is adapted for rotation with respect to the control lever to a third mode of steering wherein the second lever arm is positioned parallel to the preselected plane and the first lever arm is positioned normal thereto, said second lever arm being moveable with the control lever to control the rotation of the second pairs of wheel assemblies with respect to the second axle.

24. The control apparatus as set forth in claim 20 wherein the control module is adapted for rotation with respect to the control lever to a fourth mode of steering wherein the first and second lever arms are positioned at a preselected angle with respect to the preselected plane and movement of said control lever in either of its first and second directions will control the rotation of both the first and second pairs of wheel assemblies in the same direction with respect to the first and second axles.

25. A control apparatus, comprising:

a housing;

a control lever having an engagement member defined thereon and being mounted to the housing for reciprocating movement in a preselected plane;

a control module having a plurality of actuators defined therein and being mounted to the housing for rotation with respect to the preselected plane; and means for indexing the rotation of the control module with respect to the preselected plane to selectively position the actuators with respect to the engagement member for selective engagement of one or more of the plurality of actuators.

26. The control apparatus as set forth in claim 25 wherein the housing further defines a gate plate having a slot formed therein, said slot being adapted to receive the control lever for movement there along in said preselected plane.

27. The control apparatus as set forth in claim 25 wherein the actuators control the implementation of one of a plurality of operational modes of a machine.

28. The control apparatus as set forth in claim 27 wherein the actuators are adapted to control rotation of a first pair of wheels mounted on a first axle of a machine and a second pair of wheels mounted on a second axle between one of four preselected modes of steering for the machine.

* * * * *